S. B. LADD.
SMELTING FURNACE.
APPLICATION FILED JUNE 7, 1907.
931,775.
Patented Aug. 24, 1909.
2 SHEETS—SHEET 1.
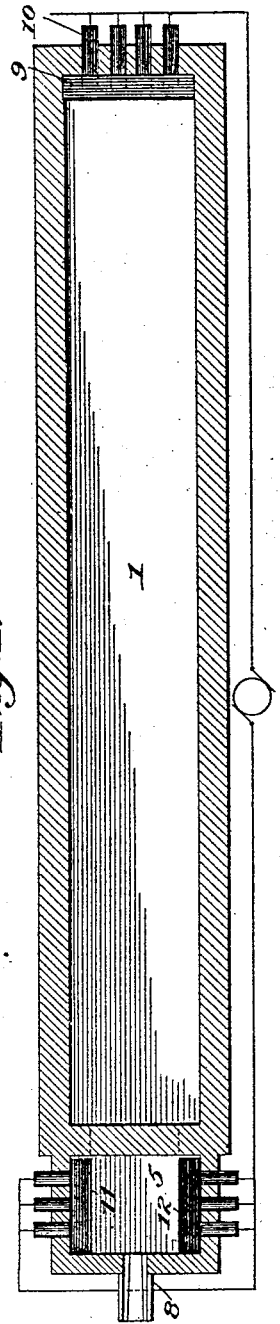
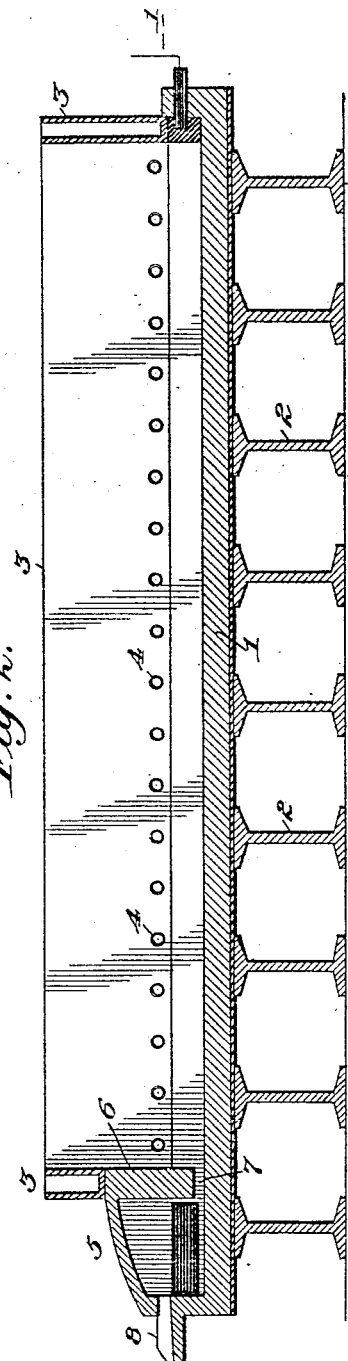
Witnesses:
Chas. H. Potter.
E. G. Fullam
Inventor:
Story B. Ladd,
by Byrnes & Townsend,
Att'ys.

S. B. LADD.
SMELTING FURNACE.
APPLICATION FILED JUNE 7, 1907.
931,775.
Patented Aug. 24, 1909.
2 SHEETS—SHEET 2.
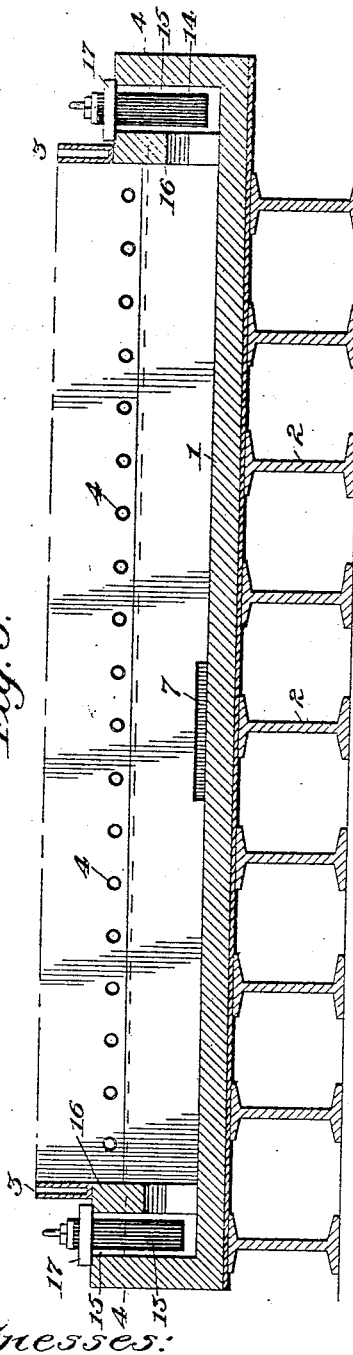
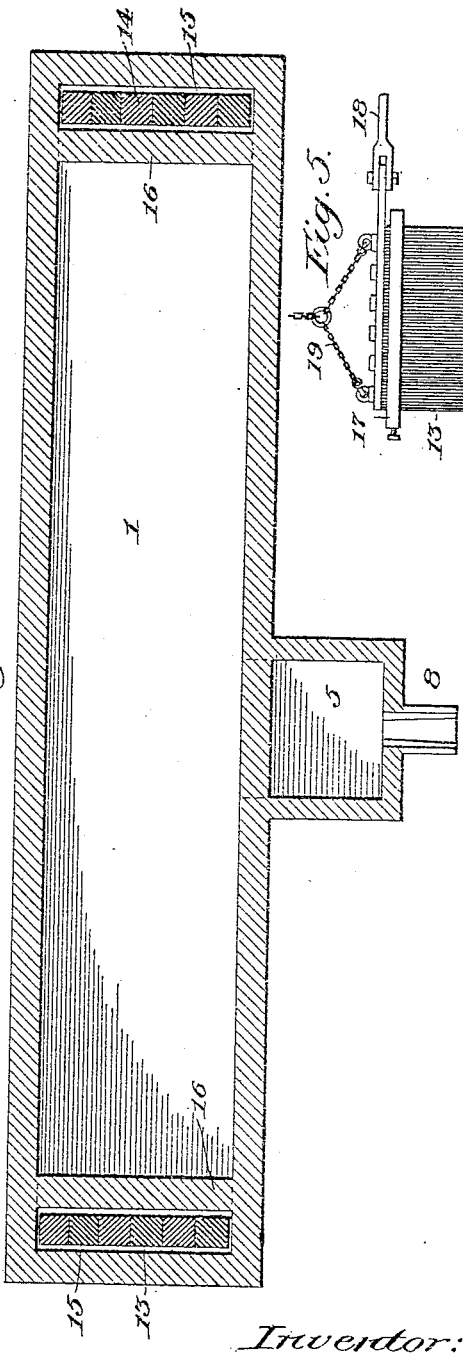

ated Aug. 24, 1909.

UNITED STATES PATENT OFFICE.

STORY B. LADD, OF WASHINGTON, DISTRICT OF COLUMBIA.

SMELTING-FURNACE.

931,775.

Specification of Letters Patent.  Patented Aug. 24, 1909.

Application filed June 7, 1907. Serial No. 377,798.

*To all whom it may concern:*

Be it known that I, STORY B. LADD, a citizen of the United States, residing at Washington, in the District of Columbia, have invented certain new and useful Improvements in Smelting-Furnaces, of which the following is a specification.

This invention is a furnace designed particularly for the smelting of sulfid ores, such for instance as pyritic ores containing copper, in accordance with the general process claimed in my copending application Serial No. 324,597, filed July 3, 1906. According to said process the pyritic ore, mixed or not with such proportion of carbon as may be deemed desirable or economical, is oxidized by air with the simultaneous application of heat by means of an electric current.

In the preferred form of furnace the necessary heat is developed by causing the electric current to traverse a molten bath of slag and matte underlying a body of unfused ore.

For a full understanding of my invention reference is made to the accompanying drawings, wherein:

Figure 1 is a horizontal section of one form of furnace; Fig. 2 is a central vertical section of the same; Fig. 3 is a central vertical section of a modified construction; Fig. 4 is a horizontal section on line 4—4 of Fig. 3; and Fig. 5 is a face view of one form of electrode.

The furnace illustrated in Figs. 1, 2 is provided with an elongated hearth 1 mounted upon suitable standards 2 and surmounted by water-jacketed side and end walls 3.

4, 4 represent twyers disposed in a horizontal series in the side walls. The hearth 1 communicates at one end with a fore-hearth 5, being very slightly inclined toward said fore-hearth if desired.

6 represents a depending bridge wall extending transversely of the furnace between the hearth 1 and the fore-hearth 5, said bridge wall extending below the normal level of the molten bath but affording a passage 7 for the slag and matte at the level of the hearth.

8 is a flowing tap for discharging matte and slag from the fore-hearth to a settling vessel of any usual or preferred type.

The means illustrated in Figs. 1 and 2 for maintaining the heat of the furnace comprise electrodes located respectively in the fore-hearth and at the end of the hearth remote from the fore-hearth, the arrangement being such that the entire molten bath within the furnace is interposed in the electric circuit and heated by the passage of the current. These electrodes may consist of carbon, graphite or water-cooled metal as will be readily understood, and are of a size corresponding to the current conditions required. As shown the electrode 9 comprises a graphite bar set transversely above the hearth at the end remote from the discharge and provided with graphite lugs 10 for connection in circuit. The other terminal of the circuit is shown as comprising electrodes 11, 12 of the same polarity, set in opposite sides of the fore-hearth 5. It will be obvious that the electrodes may be otherwise disposed, provided they do not materially obstruct the flow of the molten bath. The current employed is alternating or direct, preferably the former.

In practice a molten bath of matte and slag of suitable depth is maintained on the hearth and fore-hearth, and overflows continuously from the flowing tap 8 in quantity equal to the increment from the smelting, thereby maintaining a bath of substantially constant cross section and avoiding wide fluctuations of current. By the provision of the depending bridge wall 6 the discharge of the molten bath from the hearth 1 takes place from the bottom of the bath, and the latter is therefore continuously renewed, whereby any accumulation of solid matter or extraneous materials therein is prevented. Such accumulation does not in practice occur in the fore-hearth 5, as the matte and slag enter the same from the bottom and the stream is effective in removing all matters entering the fore-hearth with the slag. In the particular construction illustrated the velocity of flow of the molten bath is somewhat increased in the fore-hearth owing to the reduced cross section of the same as compared with the hearth, the carrying capacity of the steam being proportionately increased. The temperature of the molten bath in the fore-hearth is also somewhat higher than in the furnace owing to the greater development of heat in the relatively contracted passage 7, this higher temperature facilitating the subsequent settling of the matte.

In the modification shown in Figs. 3 and 4 the electric current traverses the molten bath between electrodes 13, 14 of opposite polarity, one or both of these electrodes being located in slag-pockets or compartments 15; as shown two such slag-pockets are located at the respective ends of the hearth and are separated therefrom by depending bridge walls 16. These depending bridge walls may, however, be omitted. In this form of furnace the fore-hearth 5 is intermediate the ends of the hearth instead of adjacent one end thereof as in Figs. 1 and 2, this construction being preferable in furnaces of great length. As will be obvious, slag-pockets for the electrodes may also be provided in the construction shown in Figs. 1 and 2. The electrodes are shown in this case as comprising a plurality of graphite bars assembled by means of a yoke 17 in which they are wedged or otherwise secured, the current connection being made to the heads of the respective bars through a detachable bus-bar 18. The electrodes are normally supported in any suitable manner upon the walls of the slag-pockets 15, and are readily removed and replaced by means of a hoist 19 or the like.

I claim:

1. A furnace for pyritic smelting, comprising an elongated hearth adapted to retain a molten bath of matte, twyers disposed above the normal level of said bath, means for passing an electric current through said bath to maintain the temperature thereof, and means for effecting a continuous withdrawal of matte from the lower portion of said bath.

2. A furnace for pyritic smelting, comprising an elongated hearth adapted to retain a molten bath of matte, twyers disposed above the normal level of said bath, means for passing an electric current through said bath to maintain the temperature thereof, a fore-hearth having a tap, and a conduit extending between said furnace and fore-hearth at the level of said hearth.

3. A furnace for pyritic smelting, comprising an elongated hearth adapted to retain a molten bath of matte, twyers disposed above the normal level of said bath, a fore-hearth having a tap, a conduit extending between said furnace and fore-hearth at the level of said hearth, and electrodes connected to opposite terminals of a source of electricity and disposed respectively in said hearth and fore-hearth.

4. A furnace for pyritic smelting, comprising an elongated hearth adapted to retain a molten bath of matte, twyers disposed above the normal level of said bath, means for passing an electric current through said bath to maintain the temperature thereof, and means for effecting a continuous withdrawal of molten material from the bath.

In testimony whereof, I affix my signature in presence of two witnesses.

STORY B. LADD.

Witnesses:
GEO. B. CHITTENDEN,
S. A. TERRY.